US012585831B1

(12) United States Patent
Jacik et al.

(10) Patent No.: US 12,585,831 B1
(45) Date of Patent: Mar. 24, 2026

(54) SYSTEMS AND METHODS FOR HYBRID HUMAN/AGENTIC CROWDSOURCED DATA VALIDATION AND VERIFICATION

(71) Applicant: Brillient Corporation, Reston, VA (US)

(72) Inventors: Richard Jacik, Lansdowne, VA (US); Urmi Majumder, Vienna, VA (US)

(73) Assignee: Brillient Corporation, Reston, VA (US)

( * ) Notice: Subject to any disclaimer, the term of this patent is extended or adjusted under 35 U.S.C. 154(b) by 0 days.

(21) Appl. No.: 19/382,980

(22) Filed: Nov. 7, 2025

(51) Int. Cl.
*G06F 21/64* (2013.01)
*H03M 1/12* (2006.01)

(52) U.S. Cl.
CPC .............. *G06F 21/64* (2013.01); *H03M 1/12* (2013.01)

(58) Field of Classification Search
None
See application file for complete search history.

(56) References Cited

U.S. PATENT DOCUMENTS

2017/0103472 A1* 4/2017 Shah ...................... G06Q 10/40
2021/0027309 A1* 1/2021 Wells ................. G06Q 30/0185
2021/0327598 A1* 10/2021 Tsai ...................... G06Q 40/08
2023/0173395 A1* 6/2023 Cella .................... G06N 3/0455
463/25
2023/0351334 A1* 11/2023 Fichuk ................. H04L 51/216
2024/0086741 A1* 3/2024 Kim ....................... G06Q 10/06
2024/0202619 A1* 6/2024 Kim .............. G06Q 10/063112

FOREIGN PATENT DOCUMENTS

WO WO-2022016102 A1 * 1/2022 ............. G06N 3/043

* cited by examiner

*Primary Examiner* — Joseph P Hirl
*Assistant Examiner* — Hassan Saadoun
(74) *Attorney, Agent, or Firm* — HEA Law PLLC; Darrin A. Auito

(57) ABSTRACT

A system and method are provided for verifying data elements in a digitalized version of analog data. The system detects objects within the digitalized version, determines whether a data element of a detected object requires verification, and, if so, provides the object to a crowdsource-verification process. The process includes presenting at least a portion of the object to reviewers, receiving review responses indicating identified values for the data element, and using the plurality of review responses to verify or adjust the data element. The verified or adjusted data element is then stored in association with the object. The system selectively provides only those objects needing verification to the crowdsource-verification process, thereby improving efficiency and accuracy in data validation. The approach supports both human and artificial intelligence reviewers and enables scalable, reliable verification of digitalized data.

20 Claims, 2 Drawing Sheets

200

| Memory 204 | ⟷ | Processing Circuitry 202 | ⟷ | Interface 206 |

SYSTEMS AND METHODS FOR HYBRID HUMAN/AGENTIC CROWDSOURCED DATA VALIDATION AND VERIFICATION

TECHNICAL FIELD

The present disclosure relates generally to management of digitalized content. More specifically, in some embodiments, the present disclosure relates to systems and methods for hybrid human/agentic crowdsourced data validation and verification.

BACKGROUND

Enterprises and public-sector organizations are rapidly transitioning from paper and other analog formats to fully electronic records to meet regulatory mandates, improve operational efficiency, and enable data-driven processes. The process of converting analog items, such as paper documents, photographs, analog sound files, and other non-digital formats, into digital form is referred to as "digitalization". The mass digitalization currently underway not only requires converting images or media to digital form but also requires accurate classification of content, extraction of structured data, cleansing and enrichment of metadata, and reliable validation before promotion to production systems.

Conventional pipelines struggle with the scale, variability, and quality demands of these numerous and varied tasks. For example, conventional approaches to digitalization and data validation typically rely on sequential, manual review processes or limited automation tools. These workflows often involve single-threaded human review for quality assurance, which can be slow, resource-intensive, and prone to bottlenecks, especially when processing large volumes of diverse analog records. Automated extraction and classification tools, such as Optical Character Recognition (OCR) engines and basic metadata enrichment services, lack the flexibility to handle non-uniform data formats, resulting in incomplete or inaccurate metadata. Furthermore, existing systems frequently fail to incorporate robust mechanisms for continuous improvement or error correction, leading to persistent data quality issues and delayed integration into production environments. The absence of scalable, collaborative validation frameworks further exacerbates these challenges, making it difficult for organizations to efficiently ensure the accuracy and reliability of digitalized content at scale.

SUMMARY

This disclosure encompasses the recognition that previous technology for validating and verifying digitalized data suffers from various technological problems and disadvantages, including those described above. For example, previous technology employs slow, single-threaded human review and inflexible automation tools and lacks any form of scalable error correction. To solve these and other technological challenges, this disclosure provides a crowdsource-verification system which leverages a collaborative, crowd-sourcing-based framework that integrates autonomous AI agents, rule-based correction engines, and dynamic reviewer participation to validate, correct, and approve digitalized content at scale. By combining peer-level AI, agentic AI, and, optionally, human expertise, the system facilitates rapid, high-quality review and continuous improvement of extracted metadata and digital representations of analog records.

This disclosure provides technical solutions to problems of computer technology, as summarized below. As a first example, conventional manual review processes are slow and resource-intensive, often resulting in data review bottlenecks and delayed integration of digitalized data. This disclosure solves this problem by implementing a collaborative review web application and suggestion service that intelligently routes review tasks to appropriate AI agents or users with relevant abilities (e.g., AI agents known to be well-adapted to review certain data or subject matter experts with expertise in a topic). This helps ensure optimal allocation of review resources and efficiently accelerates the validation cycle.

As a second example, automated data extraction tools typically struggle with non-uniform data formats, leading to incomplete or inaccurate metadata. Embodiments of this disclosure address this problem by incorporating a correction rules engine, seeded with both universal and organization-specific validation rules, such as format checks and address standardization, which are continuously updated based on crowd-sourced corrections. This engine allows the improved system and methods of this disclosure to automatically identify and apply corrections, reducing the burden on human reviewers and improving data quality over time.

As a third example, existing systems lack robust mechanisms for continuous improvement and error correction, resulting in persistent data quality issues. In some embodiments, the disclosed technology solves this problem by feeding proposed corrections from reviewers and/or support teams into an intelligent correction engine, which uses these inputs to update rules and retrain AI models for document classification and metadata extraction. This can improve the accuracy and reliability of future digitalization efforts.

In accordance with the above, in some embodiments, this disclosure is integrated into the practical application of a comprehensive, scalable system for collaborative validation and verification of digitalized data. The system's architecture supports dynamic review, automated correction, and continuous enrichment of metadata for digitalized data. This can facilitate the more efficient transformation of analog records into high-quality digital formats. By integrating crowdsourcing, AI-driven inference, and adaptive rule-based correction, embodiments of this disclosure significantly improve the accuracy, reliability, and throughput of digitalization pipelines.

In one aspect, the disclosure provides a computer-implemented method comprising receiving a digitalized version of analog data, detecting objects in the digitalized version wherein each detected object comprises a data element representing a property of the object, detecting that a first object of the detected objects has a first data element which needs verification, and, responsive to detecting that the first data element needs verification, providing the first object to a crowdsource-verification process without providing other detected objects that do not need verification to the crowdsource-verification process, wherein the crowdsource-verification process comprises providing at least a portion of the first object for review by reviewers, receiving from at least a portion of the reviewers a review response indicating an identified value for the first data element of the first object, thereby receiving a plurality of review responses each providing a corresponding identified value for the first data element of the first object, using the plurality of review responses to verify or adjust the first data element of the first object, and after using the review responses to verify or adjust the first data element of the first object, storing a record comprising the first object with the verified or adjusted first data element.

In some embodiments, the digitalized version of the analog data comprises a digitalized copy of a typed and/or handwritten document, a digitalized copy of a sound recording, or a digitalized copy of an image or video.

In some embodiments, the first data element comprises one or more of: a word or phrase detected in a sentence of text; a word or phrase detected in an audio or video recording; a type of entry detected in a document; a detected document type; a detected date or timestamp; a detected numerical value or measurement; a detected barcode or QR code; a detected signature or initial; a detected checkbox or selection indicator; a detected classification label; a detected image feature; a detected handwriting style or script type; a detected form field entry; a detected table cell value; a detected page number or section identifier; or a detected reference number.

In some embodiments, the data element of each detected object has a corresponding confidence score indicating a presumed probability that the data element is defined correctly, and the method further comprises detecting that the first object of the detected objects needs verification by comparing a first confidence score for the first data element to a predefined threshold, identifying the other detected objects that do not need verification by comparing confidence scores of the other detected objects to the predefined threshold, and after using the review responses to verify or adjust the first data element of the first object, storing the record comprising the first object with the verified or adjusted first data element and an adjusted first confidence score reflecting completion of the crowdsource-verification process for the first object.

In some embodiments, the reviewers include one or both of human reviewers and artificial intelligence agents, and the method comprises selecting the reviewers based on one or more of ability, trust, or security considerations, wherein ability, trust, and security considerations are determined based on one or more of reviewer history, reviewer credentials, and predefined organizational rules.

In some embodiments, the method further comprises determining that revealing the first object to the plurality of reviewers does not pose a security risk based on predefined security criteria, determining that revealing a second object to the reviewers poses the security risk based on the predefined security criteria, and, responsive to determining that revealing the first object does not pose the security risk and revealing the second object to the reviewers poses the security risk, allowing the first object to be presented to all of the reviewers and preventing the second object from being presented to all of the reviewers.

In some embodiments, the method further comprises identifying a subset of the reviewers comprising at least one reviewer with a security clearance suitable for viewing the second object and presenting the second object only to the subset. In some embodiments, the method further comprises determining a data type of the first data element, identifying from a set of available AI agents a subset of AI agents comprising at least one AI agent having a predetermined ability to process the data type, and providing the first object to the subset of AI agents. In some embodiments, the method further comprises determining a data type of the first data element, identifying from a set of available human reviewers a subset of human reviewers comprising at least one human reviewer having a predetermined level of expertise in the data type, and providing access to an application for presenting the first object to the subset of human reviewers.

In some embodiments, using the plurality of review responses to verify or adjust the first data element of the first object comprises weighting each review response received from each reviewer based on one or both of reviewer ability and reviewer trust.

In some embodiments, using the plurality of review responses to verify or adjust the first data element comprises one or more of: changing a word or phrase in text of the first object; changing a word or phrase in a transcript automatically generated from an audio recording or video; changing a type of entry included in a document; changing a document type; changing a date or timestamp; changing a numerical value or measurement; changing a barcode or QR code; changing a signature or initial; changing a checkbox or selection indicator; changing a classification label; changing a detected image feature; changing a handwriting style or script type; changing a form field entry; changing a table cell value; changing a page number or section identifier; or changing a reference number.

In some embodiments, the method further comprises, prior to performing the crowdsource-verification process, validating the digitalized version against predefined standards and rules for the quality, completeness, and correctness of its data and metadata, and after performing the crowdsource-verification process, updating the predefined standards and rules based on the review responses to improve accuracy and reliability of future data digitalization. In some embodiments, validating the digitalized version is performed by an artificial intelligence (AI) validation agent, and the method further comprises, after performing the crowdsource-verification process, using the review responses to retrain the AI validation agent for improved validation during future data digitalization.

In another aspect, the disclosure provides a system comprising a memory storing instructions and at least one processor coupled to the memory and configured to perform any combination of the steps of the methods, as described above.

In yet another aspect, the disclosure provides a non-transitory computer-readable storage medium containing program instructions for causing at least one processor to perform any combination of the steps of the methods, as described above.

BRIEF DESCRIPTION OF DRAWINGS

The present system is illustrated by way of example and is not limited by the figures of the accompanying drawings in which like references indicate similar elements.

DETAILED DESCRIPTION

The following detailed description makes references to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems, or devices. The following detailed description is therefore not to be taken in a limiting sense, and the scope of the present disclosure is defined by the appended claims and their equivalents.

Figure 1:
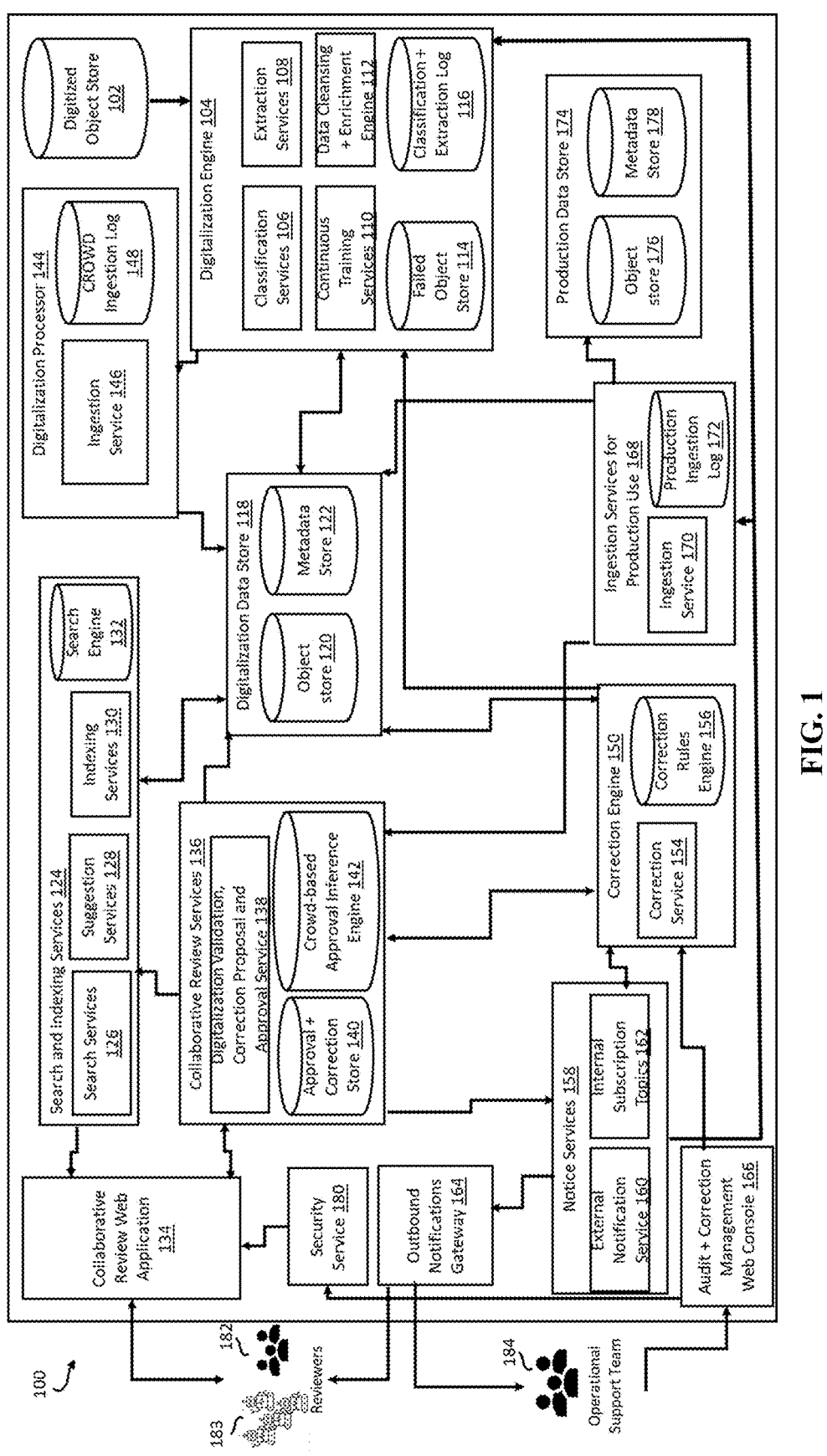
FIG. 1 is a system-level diagram of a crowdsourced validation and verification system, according to embodiments of this disclosure.

FIG. 1 illustrates an exemplary architecture of a crowd-source data validation and verification system 100. System 100 includes a plurality of interconnected subsystems that collectively enable the digitalization, validation, crowd-source-verification, correction, and approval of analog-to-digital records. In this context, an "object" refers to any discrete feature or element extracted from a digitalized version of an analog material. For example, an object may be a portion of an image of a document showing particular text, such as an entry in a data field, a date, an account number, a name, a signature, a logo, or a stamp; a portion of a sound clip or video file made from the digitalization of an analog sound or video source, such as a spoken word, phrase, or musical segment; or any other identifiable feature such as a barcode, QR code, checkbox, classification label, handwriting style, or table cell value. Objects may also include metadata elements, such as creation dates or modification history, associated with the digitalized material.

The system 100 includes a digitized object store 102, a digitalization engine 104, a digitalization data store 118, search and indexing services 124, a collaborative review web application 134, digitalization validation and collaborative review services 136; a digitalization processor 144; a correction engine 150; notice services 158; a notification gateway 164; an audit and correction management web console 166; ingestion services 168; a production data store 174; and a security service 180. The system 100 may be implemented using hardware and software, such as by a server, cloud-computing system, or similar system that includes one or more computing devices (see FIG. 2 and corresponding description below).

As described in the following, the system 100 is generally configured to receive digitalized versions of analog objects, validate their quality and correctness against adaptable standards and rules, and present select portions of the digitalized versions for crowd-based review and verification. During this process, rather than presenting the full digitalized versions of the objects for review, only select portions corresponding to objects needing verification may be provided for review. The review may be performed by human reviewers 182 and/or by AI agents 183. This approach significantly improves bandwidth and resource utilization. The system 100 may also update the standards and rules and retrain AI agents used for verification and validation purposes based on review responses to continuously improve the accuracy and reliability of future digitalization efforts.

The digitized object store 102 serves as a central repository for digitized objects, including but not limited to scanned documents, images, audio, and video files. This store is designed to preserve the original content of analog items that have been converted into digital format, ensuring their integrity for subsequent processing and review. The digitalized versions of analog data may include, for example, digitalized copies of typed and/or handwritten documents, digitalized copies of sound recordings, digitalized images or videos (e.g., photographs, maps, blueprints), as well as digitalized versions of slides, microfilms, transparencies, audio cassettes, and video cassettes. In essence, any media with an analog format that is capable of being converted into a digital representation can be stored in the digitized object store 102.

The digitalization engine 104 is responsible for processing the digitized objects from the digitized object store 102. The digitalization engine 104 includes classification services 106, which automatically or manually classify each object into its correct media type (e.g., a form, image, audio, etc.), and extraction services 108, which extract key data elements and metadata from the classified objects. The classification services 106 and extraction services 108 may utilize a suite of specialized software tools, including machine learning models (e.g., convolutional neural networks (CNNs) for image classification, recurrent neural networks (RNNs) for sequence data, or support vector machines (SVMs)), optical character recognition (OCR) engines, image recognition software, and natural language processing algorithms (e.g., named entity recognition (NER), part-of-speech tagging, or transformer-based models such as Bidirectional Encoder Representations from Transformers (BERT)). These software components can programmatically apply heuristics, such as standards and rules, to guide the classification and extraction processes. For example, rule-based engines may validate formats, check for completeness, or standardize data according to organizational or industry standards. In some embodiments, an autonomous AI agent is employed to perform classification and extraction tasks, leveraging both predefined rules and adaptive learning from prior corrections and feedback. Such AI agents may utilize ensemble learning, reinforcement learning, or active learning approaches to improve performance over time.

The digitalization engine 104 may include continuous training services 110, which leverage corrections and feedback from reviewers 182 and 183 to improve future classification and extraction accuracy. For example, corrections or updates to standards and rules for classification and extraction may be received from the correction engine 150 and implemented by the continuous training services 110 (e.g., by applying appropriate changes to parameters of services 106, 108 and/or retraining AI agents used by these services 106, 108). The digitalization engine 104 may include a data cleansing and enrichment engine 112, which applies domain-specific and general enrichment logic, such as filling in incomplete addresses or standardizing formats. The digitalization engine 104 may periodically scan the digitized object store 102 to detect new or updated content, or the digitized object store 102 may notify the digitalization engine 104 of such changes. These changes may trigger the classification and extraction processes of the digitalization engine 104.

The digitalization engine 104 may include a failed object store 114, which stores a record of objects that could not be classified or processed successfully by the digitalization engine 104. These objects may be among those sent for crowdsourced review. The digitalization engine 104 may include a classification and extraction log 116, which maintains a record of objects from the digitized object store 102 that have undergone classification and extraction.

The digitalization data store 118 holds both the digitized files in object store 120 and their associated metadata in metadata store 122. The digitalization data store 118 stores this information for easy retrieval and review. The metadata stored in the metadata store 122 may include source information, creation and modification history, extracted data elements, and any enrichment applied during processing. The object store 120 may be structured to support versioning, allowing for updated versions to be retained alongside the original, thereby providing a comprehensive audit trail and supporting continuous improvement of digitalization quality.

The search services 124 provide comprehensive indexing and search capabilities for the digitalized content in data store 118. Indexing services 130 index file metadata from the digitalization data store 118 to enable efficient search and retrieval from the browser-based collaborative review application 134. Search services 126 allow human reviewers 182 to locate and access interim digitalized content that they are permitted to view, utilizing key metadata fields and organization-specific access models as appropriate. Suggestion services 128 present reviewers 182 and 183 with recommended content to review, leveraging a set of scoring algorithms. For example, organizations may define their own optimization functions based on predefined attributes, such as record age, review status, record type frequency, and deadlines, and a scoring algorithm may list all files with no votes in reverse order of their age.

As another example of a more advanced scoring algorithm, content presented for review may be based on the frequency of record types and the number of unreviewed instances, recognizing that corrections in one instance may apply to others of the same type. Scoring algorithms may present objects of the same type for review by human reviewers 182 in a single review session, such that the human reviewers 182 can more efficiently perform their review without having to cognitively switch between different tasks. This cognitive switching can result in missed details, difficulty starting new tasks, and a drop in productivity. For example, reviewing multiple text entries may be more efficient than switching between reviewing text, images, sounds, etc. Scoring algorithms may be deterministic or machine learning-based, and can incorporate multiple attributes, such as the number of negative votes and comments, to calculate a weighted score for each record and present results in order of priority for review and correction.

The collaborative review web application 134 provides a user interface for human reviewers 182 and an API for AI agent reviewers 183 to review digitalized content, propose corrections, and approve or disapprove the quality of both the digitalization and extracted metadata. The reviewers 182 may be organization members, citizen validators, or other individuals willing to review objects for validation or they may be internal or externally owned AI agents 183 owned by relevant service providers or individuals. In the collaborative review web application 134, each interim digitalized file (e.g., digitalized file from which the object or set of objects under review was obtained) may be accessible from the search view for more detailed review. In this view, reviewers 182 and 183 may indicate their approval on the characterization of the object. For example, the collaborative review web application 134 may present a window showing the object, such as a portion of a document containing text that may have been incorrectly recognized by an OCR tool. The reviewer may be presented with a data element extracted for the object, such as a text string corresponding to the OCR-extracted text. If reviewers 182 find any issues or errors with the characterization (e.g., if the object does not match the extracted text), they can indicate this via a comment or by voting down on the result. Reviewers 182 and 183 may also indicate their approval or disapproval on other reviewers' comments or votes. Since digitalization results for a specific record type from a specific organization tend to be similar, the collaborative review web application 134 may be configured to present objects for batch approval by reviewers 182 and 183.

The collaborative review web application 134 may support dynamic levels of granularity, including micro-verifications, and enable users to vote, comment, and batch-approve content. Reviewers 182 and 183 may have a predefined amount of time to complete a given review or set of reviews, and the review clock may be reset on any content that is corrected based on previous correction proposals.

Review and correction features available in the collaborative review web application 134 may be managed by business services implemented within the digitalization validation, correction proposal and approval service 138, which is part of the collaborative review services 136, as described below.

The collaborative review service 136 manages functions related to the validation, correction, and approval of digitalized content within the system 100. Specifically, the digitalization validation, correction proposal, and approval service 138 orchestrates the workflows for data review, correction proposals, and approval processes. Each interim digitalized file is accessible to authorized users via a search view in the collaborative review web application 134, enabling detailed inspection and review. In this interface, reviewers 182 and 183 may indicate their approval of the overall quality of both the digitized file and its extracted metadata, either with or without providing additional comments. If reviewers 182 and 183 identify any issues or errors, they may submit comments or vote down the result, and can also express approval or disapproval of other reviewers' comments or votes, as described above. These services ensure that validation, correction, and approval activities are executed efficiently, transparently, and in accordance with organizational policies and system rules.

The approval inference engine 142 may act as a background service that identifies content for which the review period is complete to determine whether the content can be considered "approved" based on an organization-specific approval function. The approval inference engine 142 may be seeded with a set of predefined approval functions, which may be customized or updated over time. An example approval function may simply track the number of positive and negative votes on a digitalization result and if the difference between the positive and the negative votes is greater than zero, the record may be approved. More complex approval functions can assign higher weights to votes from certain (e.g., high quality/high trust) human reviewers 182 or AI verification agents 183 before calculating the weighted sum of all positive and negative votes on an object undergoing review. For example, the collaborative review services 136 may maintain user statistics around corrections and approvals in its local corrections and approvals store 140. This information can be used to assign higher weights to votes from human reviewers 182 or AI verification agents 183 who have historically performed large numbers of reviews or whose comments/votes have received positive feedback from other human reviewers 182 or AI verification agents 183.

The digitalization processor 144 orchestrates the ingestion of validated and approved digitalized objects into the system. The digitalization processor 144 maintains logs to support reprocessing, reimaging, and auditability. In this way, the digitalization processor 144 may help ensure that only objects which have been correctly classified and have had all required data elements accurately extracted are advanced to subsequent workflow stages. The digitalization processor 144 includes an ingestion service 146, which transfers or copies only documents that meet all classification and extraction criteria into the digitalization data store 118. Only fully validated digitalized objects may be made available in the digitalization data store 118 for further review, correction, and approval within the system. An ingestion log 148 may store a record (e.g., in a database or the like) of digitalized objects received and processed by the digitalization processor 144.

The correction engine 150 includes correction services 154 and a correction rules engine 156. The correction services 154 may include a comprehensive suite of scripts designed to implement all corrections reported by the reviewers 182 and 183. These services may be configured to systematically crawl (e.g., review) the metadata store 122 to identify similar issues across digitalized records and to suggest appropriate corrections based on detected patterns. Additionally, correction services 154 may use natural language processing techniques (e.g., Named Entity Recognition (NER) algorithms, sentiment analysis algorithms, text similarity algorithms (e.g., cosine similarity or Jaccard similarity), pattern matching algorithms (e.g., regular expression engines), intent detection algorithms, fuzzy matching algorithms, machine learning models, and transcription algorithms for audio-to-text conversion) to analyze correction feedback submitted by reviewers 182 and 183 and/or end users of data processed by the system 100, enabling the inference of new correction rules from user-generated input.

The correction rules engine 156 maintains a robust database of correction rules, encompassing both domain-specific and organization-agnostic rules, which are continuously updated based on user feedback and system learning. These rules are used by the digitalization engine 104, as described above, to proactively prevent recurrence of similar errors in future digitalization cycles. The correction engine 150 may support full CRUD (Create, Read, Update, Delete) operations on the correction rules engine 156, allowing for the addition and modification of rules, including those automatically inferred by the approval inference engine 142 and those provided by reviewers 182 and 183. For example, the correction rules engine 156 may also maintain a record (e.g., in a database or the like) of reported corrections, which are populated both automatically by the approval inference engine 142 and manually by the reviewers 182 and 183. This record may be used by the digitalization engine 104 to proactively prevent the recurrence of similar errors in future digitalization cycles, thereby improving the efficiency and accuracy of the review process over time. Correction rules maintained within the engine may be domain-specific-such as filling in a missing customer link in a document using contextual information from related documents within the same electronic folder-or organization-agnostic, such as replacing every instance of the letter "O" with a zero in Social Security Numbers or phone numbers, or populating missing city and state information in addresses using a zip code lookup. By leveraging both domain-specific and organization-independent rules, the correction engine 150 helps ensure robust, context-aware, and scalable correction capabilities throughout the digitalization workflow.

The notice services 158 facilitate both internal and external notifications within the system 100. The external notification service 160 is responsible for notifying external entities, such as an internal support team 184 (e.g., an IT or business team), when new records are populated in the digitalization data store 118 by the digitalization processor 144, when corrections are requested or completed, and when content is approved for production ingestion. External notifications may be transmitted via the outbound notification gateway 164, which serves as a centralized channel for delivering notifications to designated recipients outside the system 100. The internal subscription topics 162 include a record of notification topics, including correction and approval events, which are subscribed to by relevant system components, such as the correction engine 150 and digitalization processor 144. These internal topics enable event-driven interactions, allowing components of the system 100 to respond to correction requests, implement corrections, and approve decisions rapidly and efficiently (e.g., in real-time or near real-time). Through integration with both the internal subscription topics 162 and the outbound notification gateway 164, the notice services 158 help ensure timely, reliable, and context-aware communication across the digitalization workflow, supporting efficient review, correction, and approval processes.

The audit and correction management web console 166 is a web application that provides a centralized interface for the support team 184 to access, review, and manage the quality of digitized content and associated metadata extracted from scanned documents by the digitali zation processor 144. This console may enable support engineers to perform comprehensive audits of both digitalization quality and metadata accuracy, leveraging configurable validation criteria and correction workflows. For example, content ingested into the digitalization data store 118 by the digitalization processor 144 may not be visible to end users until it passes initial quality checks. Support engineers from support team 184 may use the web console to flag documents for metadata corrections, image quality issues, or other anomalies, and specify targeted corrections at varying levels of granularity, including per-field, per-document, or batch-level updates. The console may support both local and global correction actions, allowing engineers to address individual errors or apply rule-based corrections across multiple documents sharing similar issues.

When corrections are implemented, the web console 166 provides tools for reviewing updated content, tracking correction history, and validating the effectiveness of applied changes before releasing the content for business user review. Additionally, the console may integrate with the system's notice services 158 and collaborative review services 136, allowing the support team 184 to coordinate correction requests, monitor approval status, and ensure that only high-quality, verified content is made available for downstream review and production ingestion. This robust audit and correction management capability enhances the overall reliability, traceability, and scalability of the digitalization workflow, supporting continuous improvement and compliance with organizational and regulatory standards.

The production ingestion services 168 ingest approved records into the production data store 174 from the digitalization data store 118. This ingestion is driven by the notification that the crowd-based approval inference engine 142 sends into the notice services 158. The ingestion service 170 collects the details of the approvals from the collaborative review services 136 to identify all the objects that can move from the digitalization data store 118 to the production data store 174 and implements the movement of this data. The production ingestion log 172 stores a record (e.g., as a database or the like) of what is stored in the production data store 174.

The production data store 174 is the final repository for sanitized, fully approved digital objects and their metadata, ready for consumption by business applications and downstream processes. The production data store 174 includes an object store 176 storing these sanitized, fully approved digital objects (e.g., in a database or similar). The production data store 174 includes a metadata store 178 for storing the corresponding metadata (e.g., in a database or similar).

The security service 180 manages authentication and authorization for users accessing the system 100, integrating with external identity providers or providing built-in user management as needed. For example, the security service 180 may integrate with an organization's authentication and authorization service using industry-standard protocols, such as LDAP, OpenID Connect, or SAML, to determine who can access the collaborative review web application 134 as well as the audit and correction management web console 166. The security service 180 may handle parsing of an external authentication token, including roles for the reviewers 182 and 183, to determine what operations an authenticated reviewer 182 and 183 can or cannot perform in the web application 134. The security service 180 may include built-in user management, for example, if an organization does not want to use an external authentication and authorization service.

In an example operation, the system 100 commences with the establishment of review rules for the digitalized version of the material to be ingested, enabling data verification and validation within the system 100. The digitalization engine 104, including classification services 106 and extraction services 108, performs initial digitalization of analog source materials (if not already completed), object classification, metadata and data extraction, data cleansing, and data enrichment. The processed object data and associated metadata are transmitted to the digitalization processor's ingestion service 146. The ingestion service 146 validates the received package, records ingestion log information to facilitate subsequent reprocessing or reimaging if required, and persists the original image, derived data, and associated metadata in the digitalization data store 118. The search and indexing services 124 index the contents of the digitalization data store 118 continuously or at regular intervals and store the resulting indices in the search engine data store 132. The suggestion services 128 execute inference-driven and rule-based algorithms to match objects to relevant review groups and prioritize these items for review by discrete groups or individual reviewers.

Upon request from the collaborative review services 136, the suggestion services 128 provide prioritized match data to a reviewer 182 and 183 currently requesting a review work item via the collaborative review web application 134 or an alternative mechanism. The collaborative review services 136 present the review work item to the collaborative review web application 134, including supported voting and comment flags, thereby enabling the user interface to accurately reflect the permitted actions for reviewing the object. Reviewers 182 and 183 interact with the collaborative review web application 134 to verify, validate, correct, approve, or express like/dislike regarding object tagging or digitalization inferences.

Review responses are transmitted to the digitalization validation, correction proposal, and approval service 138, which persists the data in the approval and correction store 140 and accesses the crowd-based approval inference engine 142 to determine whether the object satisfies criteria for full approval, based on longitudinal reviews and algorithmic evaluation. If the object is determined to be fully approved, the production ingestion process is initiated. The ingestion services 170 retrieve the object with its corresponding digital approval and execute the ingestion service to promote the approved data, inferred data, corrected data, and digitized image to a production data pipeline for migration to production data stores 174.

The correction engine 150 automatically executes defined scripts against data in the digitalization data store and utilizes data from the approval and correction store 140 to perform agentic operations, including: (i) identifying data correction trends and generating correction scripts; (ii) inferring and submitting additional data verification, validation, correction, approval, like, or dislike actions on similar objects presented for review to the digitalization validation, correction proposal, and approval service 138; and (iii)

submitting mass correction actions to the notice services 158 for human review of high-impact or wide-impact data corrections and approvals.

In another example operation of the system 100, the process begins with the digitalization engine 104 receiving a digitalized version of an analog source material, such as a paper document, photograph, or audio recording. The digitalization engine 104 detects objects in the digitalized version. For example, types of objects may include, among others, text entries, words or phrases in sentences, handwritten text, typed text, signatures, initials, logos, images, photographs, maps, blueprints, audio recordings, video recordings, spoken words or phrases, document types, dates or timestamps, numerical values or measurements, barcodes, QR codes, checkboxes or selection indicators, classification labels, image features (such as seals or watermarks), handwriting styles or script types, form field entries, table cell values, page numbers, section identifiers, or reference numbers.

As described above, the digitalization engine 104 then performs object classification, metadata/data extraction, data cleansing, and data enrichment. During these processes, data elements including metadata are determined for each object. As an example, one object may be detected corresponding to a text entry in a form field of a document, and the associated data element may be a string of extracted text using an OCR tool. Another detected object may correspond to a signature detected in a signature field of the document, and the data element may be extracted text for the signature, similar to the previous example. Another object may correspond to a logo presented in a particular region of the document, and the data element may be a string of text indicating the logo type, size, color, and/or an organization believed to be associated with the logo. The data elements for these detected objects may not be correct, and system 100 facilitates the efficient and reliable correction of data elements for objects.

While various examples are described in this disclosure, data elements may more generally be any discrete attribute present in the digitalized version of the analog data that is capable of being verified or corrected by the crowdsource-verification process of this disclosure. Data elements may include, for example, a word or phrase detected in a sentence of text; a word or phrase detected in an audio or video recording; a type of entry detected in a document (e.g., a name, address, title); a detected document type; a detected date or timestamp; a detected numerical value or measurement; a detected barcode or QR code; a detected signature or initial; a detected checkbox or selection indicator; a detected classification label; a detected image feature; a detected handwriting style or script type; a detected form field entry; a detected table cell value; a detected page number or section identifier; or a detected reference number.

Prior to performing the crowd-verification process, the digitalized version of the analog material may be validated by checking the quality, completeness, and correctness of data and metadata included in the digitalized version against predefined standards and rules. Validation may be performed by programmatically applying rules or heuristics, establishing validity criteria, and/or using appropriate trained AI validation agents. Verification outcomes may be used to both update the rules and retrain the AI models used by the AI validation agents.

Crowdsource-verification is performed when the system 100 detects that an object has a data element which needs verification. For example, the data element of the object may have a confidence score or other attribute which calls into question the reliability or correctness of the data element. Confidence scoring may be performed using probabilistic models (such as Bayesian inference), ensemble methods, or neural network-based uncertainty estimation, which aggregate outputs from classification and extraction algorithms and historical reviewer feedback. The confidence score may be obtained from the same algorithm or algorithms used for classification and extraction. For example, the confidence score may indicate a presumed probability that the data element was defined correctly by the classification and/or extraction algorithms used to identify the data element. The system 100 may weight the confidence scores based on a history of the performance of the algorithms used to extract objects and/or reviewer feedback. The system 100 may detect that the object needs verification by comparing its confidence score to a predefined threshold. For instance, if the confidence score is below the threshold, crowdsource-verification may be needed.

Other objects with confidence scores above this threshold (or an appropriate threshold for their object type) are typically not provided for crowd-verification to preserve bandwidth and processing resources. Correction rule inference may be performed using pattern mining algorithms, association rule learning (e.g., using the Apriori algorithm or another appropriate algorithm) and/or supervised learning models that analyze reviewer feedback and detected correction trends to automatically generate new correction rules. After detecting that the data element needs verification, the object is provided to system components for the crowd-source-verification process without providing the other objects that do not need verification for the crowdsource-verification process. Significant bandwidth and processing resources are preserved by preventing the transmission and processing of the other objects.

The web application 134 is then used to present at least a portion of the object to reviewers, which may include the human reviewers 182 and/or agentic reviewers 183, such as the AI verification agents described above. The system 100 may select the reviewers based on their ability, trust, and/or security considerations. For example, security considerations may include verifying that a reviewer 182 or 183 possesses the necessary security clearance level for the sensitivity of the object, confirming the reviewer's compliance with organizational security protocols, or ensuring that the reviewer's access history does not indicate prior security violations. Trust may be quantified using metrics such as reviewer reliability scores, which are calculated based on historical accuracy, consistency in prior reviews, and feedback from other reviewers or system audits. The system 100 may also use multi-factor authentication and background checks to further assess trustworthiness. These factors may be evaluated using automated scoring algorithms that aggregate reviewer credentials, performance data, and security attributes to determine eligibility for reviewing specific objects.

As additional examples, reviewer selection may be performed using algorithms such as collaborative filtering, clustering (e.g., k-means or hierarchical clustering), or decision tree-based matching, which analyze reviewer history, credentials, and organizational rules to assign review tasks. These characteristics may be based on reviewer history, reviewer credentials, and/or predefined organizational rules, as described above. For example, a reviewer may be selected based on determining that revealing the object to the reviewer does not pose a security risk based on predefined security criteria. Meanwhile, another object from the same or different analog source material may not be appropriate to provide to that reviewer. In some embodiments, objects from an analog material that includes security-sensitive information may still be safely shareable with a relatively large number of reviewers, such that review of the object (e.g., representing only a small non-security sensitive portion of the material) can be completed with high throughput without waiting for specialized reviewers having the high level of security clearance needed to view the original material itself. Objects that still require security clearance will not be sent to general reviewers but will instead only be provided to reviewers with a suitable security clearance to view the object.

A subset of the reviewers 182 and 183 may be selected or identified who have a predetermined level of expertise in the data type being verified. In general, reviewers 182 and 183 may be associated with different skills, abilities, or knowledge that are in turn associated with different data types. Reviewers 182 and 183 may be matched to review tasks based at least in part on these associations. The web application 134 may present the object to the subset of human reviewers with the appropriate skills, abilities, or knowledge. In some cases, the object may be presented as part of a bulk review of similar objects (e.g., objects of the same type or with similar features). This can make the review process less cognitively challenging for human reviewers 182 because the reviewers will not be required to cognitively switch between reviewing different types of objects. This improves review quality and throughput, as described above. For instance, reviewers may more reliably and more quickly review a group of objects that only contains handwritten text entries than a group of objects that includes some sound clips, some video clips, some typed text, and some handwritten text. In this way, the improved technology offered by system 100 may also facilitate easier, more efficient, and more reliable human review.

In embodiments where an AI verification agent is used as a reviewer, the system 100 may identify, from a set of available AI agents, a subset of one or more AI agents with a predetermined ability to process the type of data requiring verification. For example, each available AI agent may be assigned a performance score for different data types or data extraction types. These scores may be predefined at the time the AI agents are put into operation and may be adjusted or updated based on their performance history. For example, scores may be increased if performance history indicates that data elements are correctly extracted for objects of the type being scored. AI agents with scores above a predefined threshold may be used to review the data element of the object. In some embodiments, human review may not be needed (e.g., if sufficient, high-quality review responses are available from the AI agents).

Review responses are received from at least a portion of the reviewers (e.g., from a number of reviewers sufficient to form a consensus based on criteria established by the organization). These review responses may indicate a vote, score, or value for the data element under verification. For example, responses may include a vote on a value for the data element (e.g., a "YES" vote indicating the data element matches the object or a "NO" vote if it does not correspond). Responses may also include manually entered values for the data element (e.g., text provided by the reviewer corresponding to an object that is an image of typed or handwritten text from a document). Additionally, responses may be values selected from a list of options (e.g., if a word spoken in a sound clip was matched to three possible phrases, reviewers may be offered to select from these three phrases to identify the correct transcript text to associate with the object).

The review responses are used to verify or adjust the data element for the object under verification. For example, if a consensus is reached among reviewers that the data element accurately reflects the object, the data element may be retained without modification. Conversely, if review responses indicate discrepancies or errors, the data element may be updated to reflect the value most strongly supported by reviewers, such as the option receiving the majority of votes or a value provided by reviewers with higher trust or ability scores. In some cases, the system may apply weighted algorithms to determine the final value, considering reviewer expertise, historical accuracy, and other relevant factors. This process ensures the verified data element is both accurate and reliable, leveraging collective input to improve data quality.

If a change to the data element is needed, the data element may be adjusted through any appropriate modification. By way of example, adjusting the data element may involve changing a word or phrase in text of the first object; changing a word or phrase in a transcript automatically generated from an audio recording or video; changing a type of entry included in a document; changing a document type; changing a date or timestamp; changing a numerical value or measurement; changing a barcode or QR code; changing a signature or initial; changing a checkbox or selection indicator; changing a classification label; changing a detected image feature (e.g., logo, seal, watermark); changing a handwriting style or script type; changing a form field entry; changing a table cell value; changing a page number or section identifier; and/or changing a reference number.

A record is then stored in the production data store 174 that includes the verified object with its verified or adjusted data element. In some embodiments, a confidence score is associated with the data element, and this score may be increased after the crowdsource-verification process is completed.

After the crowdsource-verification process is complete, the predefined standards and rules used for initial data validation may be updated, as described above, based on the review responses to improve the accuracy and reliability of future data digitalization. Similarly, the review responses may be used to retrain the AI models included in the AI validation agents used for data validation.

Figure 2:
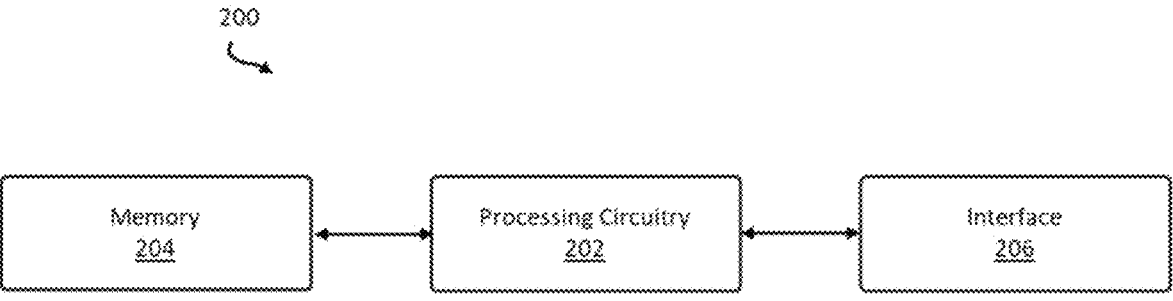
FIG. 2 is a diagram depicting exemplary processing hardware for implementing the system of FIG. 1.

FIG. 2 illustrates an example processing device 200. The processing device 200 or a collection of processing devices 200 (e.g., arranged as one or more servers) may be employed to implement one or more of the components of the system 100 of FIG. 1. The device 200 includes processing circuitry 202, memory 204, and a communications interface 206. The processing circuitry 202 includes one or more processors. The processing circuitry 202 includes any electronic circuitry, such as state machines, one or more central processing unit (CPU) chips, logic units, cores (e.g., a multi-core processor), field-programmable gate array (FPGAs), application-specific integrated circuits (ASICs), digital signal processors (DSPs), neural processing units (NPUs), graphics processing units (GPUs), tensor processing units (TPUs), and/or the like. The processing circuitry 202 may be a programmable logic device, a microcontroller, a microprocessor, or any suitable combination of these or similar devices. The processing circuitry 202 is communicatively coupled to and in signal communication with the memory 204. The one or more processors are configured to process data and may be implemented in hardware and/or software. For example, the processing circuitry 202 may be 8-bit, 16-bit, 32-bit, 64-bit or of any other suitable architecture. The processing circuitry 202 may include an arithmetic logic unit (ALU) for performing arithmetic and logic operations, processor registers that supply operands to the ALU and store the results of ALU operations, and a control unit that fetches instructions from memory 204 and executes them by directing the coordinated operations of the ALU, registers and other components.

The memory 204 includes any logic, instructions, code, and/or rules for implementing the functions of the system 100 of FIG. 1. The memory 204 may include one or more disks, tape drives, or solid-state drives to store programs when such programs are selected for execution and to store instructions and data that are read during program execution. The memory 204 may be volatile or non-volatile and may include, for example, read-only memory (ROM), random-access memory (RAM), ternary content-addressable memory (TCAM), dynamic random-access memory (DRAM), and static random-access memory (SRAM).

The communications interface 206 is configured to enable wired and/or wireless communications between other devices or systems. For example, the communications interface 206 may include a network interface, such as a Wi-Fi interface, a local area network (LAN) interface (e.g., an Ethernet interface), a wide area network (WAN) interface, a modem, a switch, or a router. The communications interface 206 may also include a hardware interface, such as a Universal Serial Bus (USB) interface, a parallel interface, and the like. The processing circuitry 202 may send and receive data using the communications interface 206, which may be configured to use any suitable type of communication protocol.

As used herein, the term "object" refers to any discrete portion of a digitalized version of an analog source material that is subject to processing, validation, correction, or review. An object may include or be associated with one or more data elements. An object may be a feature extracted from or derived from a digitalized version of an analog material, such as a portion of an image of a document showing particular text, an entry in a data field, a date, an account number, a name, a signature, or other information. Additionally, an object may be a portion of a digital sound clip or digital video created from the digitalization of an analog sound or video source material. Examples of objects include, but are not limited to, portions of images, portions of documents, text entries, dates, account numbers, names, signatures, and segments of audio or video files.

Unless indicated otherwise, the term "data element" generally refers to an individual unit of data associated with an object. A data element may be a field, attribute, value, or any atomic piece of information that can be extracted, analyzed, validated, or corrected for an object. Examples of data elements include names, dates, identification numbers, addresses, or other specific information associated with an object. A data element may indicate an object's classification, location, or value, or describe some other attribute of an object.

The term "AI agent" refers to a software-based subsystem or module that uses artificial intelligence techniques, such as machine learning, natural language processing, or rule-based reasoning, to perform automated tasks. For example, AI agents may be configured to extract data elements from objects, assign confidence scores, suggest corrections, and assist in reviewer selection, among other functions. An AI agent may operate independently or in conjunction with human reviewers and/or other system components.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented using software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the methods and embodiments described herein. Thus, the operation and behavior of the systems and methods were described without reference to specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc, laser disc, optical disc, digital versatile disc, floppy disk, and Blu-ray disc, where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter, e.g., for applications suitable for public and private sectors. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the claims in the non-provisional application claiming priority to this provisional application.

What is claimed is:

1. A computer-implemented method, comprising, by at least one processor:

receiving a digitalized version of analog data;

detecting objects in the digitalized version, wherein each detected object comprises a data element representing a property of the object;

detecting that a first object of the detected objects has a first data element which needs verification;

responsive to detecting that the first data element needs verification, providing the first object to a crowdsource-verification process without providing other detected objects that do not need verification to the crowd-source-verification process, wherein the crowdsource-verification process comprises:

providing at least a portion of the first object for review by reviewers; and receiving, from at least a portion of the reviewers, a review response indicating an identified value for the first data element of the first object, thereby receiving a plurality of review responses each providing a corresponding identified value for the first data element of the first object;

using the plurality of review responses to verify or adjust the first data element of the first object; and after using the review responses to verify or adjust the first data element of the first object, storing a record comprising the first object with the verified or adjusted first data element.

2. The method of claim 1, wherein the digitalized version of the analog data comprises a digitalized copy of a typed and/or handwritten document, a digitalized copy of a sound recording, or a digitalized copy of an image or video.

3. The method of claim 1, wherein the first data element comprises one or more of: a word or phrase detected in a sentence of text; a word or phrase detected in an audio or video recording; a type of entry detected in a document; a detected document type; a detected date or timestamp; a detected numerical value or measurement; a detected barcode or QR code; a detected signature or initial; a detected checkbox or selection indicator; a detected classification label; a detected image feature; a detected handwriting style or script type; a detected form field entry; a detected table cell value; a detected page number or section identifier; or a detected reference number.

4. The method of claim 1, wherein the data element of each detected object has a corresponding confidence score indicating a presumed probability that the data element is defined correctly, the method further comprising:

detecting that the first object of the detected objects needs verification by comparing a first confidence score for the first data element to a predefined threshold;

identifying the other detected objects that do not need verification by comparing confidence scores of the other detected objects to the predefined threshold; and after using the review responses to verify or adjust the first data element of the first object, storing the record comprising the first object with the verified or adjusted first data element and an adjusted first confidence score reflecting completion of the crowdsource-verification process for the first object.

5. The method of claim 1, wherein the reviewers include one or both of human reviewers and artificial intelligence agents, the method comprising selecting the reviewers based on one or more of ability, trust, or security considerations, wherein ability, trust, and security considerations are determined based on one or more of reviewer history, reviewer credentials, and predefined organizational rules.

6. The method of claim 5, further comprising:

determining that revealing the first object to the plurality of reviewers does not pose a security risk based on predefined security criteria;

determining that revealing a second object to the reviewers poses the security risk based on the predefined security criteria; and responsive to determining that revealing the first object does not pose the security risk and revealing the second object to the reviewers poses the security risk, allowing the first object to be presented to all of the reviewers and preventing the second object from being presented to all of the reviewers.

7. The method of claim 6, further comprising:

identifying a subset of the reviewers comprising at least one reviewer with a security clearance suitable for viewing the second object; and presenting the second object only to the subset.

8. The method of claim 1, further comprising:

determining a data type of the first data element;

identifying, from a set of available AI agents, a subset of AI agents comprising at least one AI agent having a predetermined ability to process the data type; and providing the first object to the subset of AI agents.

9. The method of claim 1, further comprising:

determining a data type of the first data element;

identifying, from a set of available human reviewers, a subset of human reviewers comprising at least one human reviewer having a predetermined level of expertise in the data type; and providing access to an application for presenting the first object to the subset of human reviewers.

10. The method of claim 1, wherein using the plurality of review responses to verify or adjust the first data element of the first object, comprises weighting each review response received from each reviewer based on one or both of reviewer ability and reviewer trust.

11. The method of claim 1, wherein using the plurality of review responses to verify or adjust the first data element comprises one or more of: changing a word or phrase in text of the first object; changing a word or phrase in a transcript automatically generated from an audio recording or video; changing a type of entry included in a document; changing a document type; changing a date or timestamp; changing a numerical value or measurement; changing a barcode or QR code; changing a signature or initial; changing a checkbox or selection indicator; changing a classification label; changing a detected image feature; changing a handwriting style or script type; changing a form field entry; changing a table cell value; changing a page number or section identifier; or changing a reference number.

12. The method of claim 1, further comprising:

prior to performing the crowdsource-verification process, validating the digitalized version against predefined standards and rules for the quality, completeness, and correctness of its data and metadata; and after performing the crowdsource-verification process, updating the predefined standards and rules based on the review responses to improve accuracy and reliability of future data digitalization.

13. The method of claim 12, wherein validating the digitalized version is performed by an artificial intelligence (AI) validation agent, the method further comprising:

after performing the crowdsource-verification process, using the review responses to retrain the AI validation agent for improved validation during future data digitalization.

14. A system comprising a memory storing instructions and at least one processor coupled to the memory, and configured to:

receive a digitalized version of analog data;

detect objects in the digitalized version, wherein each detected object comprises a data element representing a property of the object;

detect that a first object of the detected objects has a first data element that needs verification;

responsive to detecting that the first data element needs verification, provide the first object to a crowdsource-verification process without providing other detected objects that do not need verification to the crowdsource-verification process, wherein the crowdsource-verification process comprises:

provide at least a portion of the first object for review by reviewers; and receive, from at least a portion of the reviewers, a review response indicating an identified value for the first data element of the first object, thereby receiving a plurality of review responses each providing a corresponding identified value for the first data element of the first object;

use the plurality of review responses to verify or adjust the first data element of the first object; and after using the review responses to verify or adjust the first data element of the first object, store a record comprising the first object with the verified or adjusted first data element.

15. The system of claim 14, wherein the data element of each detected object has a corresponding confidence score indicating a presumed probability that the data element is defined correctly, the one or more processors further configured to:

detect that the first object of the detected objects needs verification by comparing a first confidence score for the first data element to a predefined threshold;

identify the other detected objects that do not need verification by comparing confidence scores of the other detected objects to the predefined threshold; and after using the review responses to verify or adjust the first data element of the first object, store the record comprising the first object with the verified or adjusted first data element and an adjusted first confidence score reflecting completion of the crowdsource-verification process for the first object.

16. The system of claim 14, wherein the reviewers include one or both of human reviewers and artificial intelligence agents, the one or more processors further configured to select the reviewers based on one or more of ability, trust, or security considerations, wherein ability, trust, and security considerations are determined based on one or more of reviewer history, reviewer credentials, and predefined organizational rules.

17. The system of claim 15, the one or more processors further configured to:

determine a data type of the first data element;

identify, from a set of available AI agents, a subset of AI agents comprising at least one AI agent having a predetermined ability to process the data type; and provide the first object to the subset of AI agents.

18. The system of claim 14, wherein the one or more processors are configured to weight each review response received from each reviewer based on one or both of reviewer ability and reviewer trust.

19. The system of claim 14, the one or more processors further configured to:

prior to performing the crowdsource-verification process, validate the digitalized version against predefined standards and rules for the quality, completeness, and correctness of its data and metadata; and after performing the crowdsource-verification process, update the predefined standards and rules based on the review responses to improve accuracy and reliability of future data digitalization.

20. A non-transitory computer-readable storage medium containing program instructions for causing at least one processor to perform a method of, by one or more processors:

receiving a digitalized version of analog data;

detecting objects in the digitalized version, wherein each detected object comprises a data element representing a property of the object;

detecting that a first object of the detected objects has a first data element which needs verification;

responsive to detecting that the first data element needs verification, providing the first object to a crowdsource-verification process without providing other detected objects that do not need verification to the crowdsource-verification process, wherein the crowdsource-verification process comprises:

providing at least a portion of the first object for review by reviewers; and receiving, from at least a portion of the reviewers, a review response indicating an identified value for the first data element of the first object, thereby receiving a plurality of review responses each providing a corresponding identified value for the first data element of the first object;

using the plurality of review responses to verify or adjust the first data element of the first object, and after using the review responses to verify or adjust the first data element of the first object, storing a record comprising the first object with the verified or adjusted first data element.

* * * * *